B. C. ROCKWELL.
TRUCK.
APPLICATION FILED JUNE 3, 1910.
1,024,701.
Patented Apr. 30, 1912.
2 SHEETS—SHEET 1.
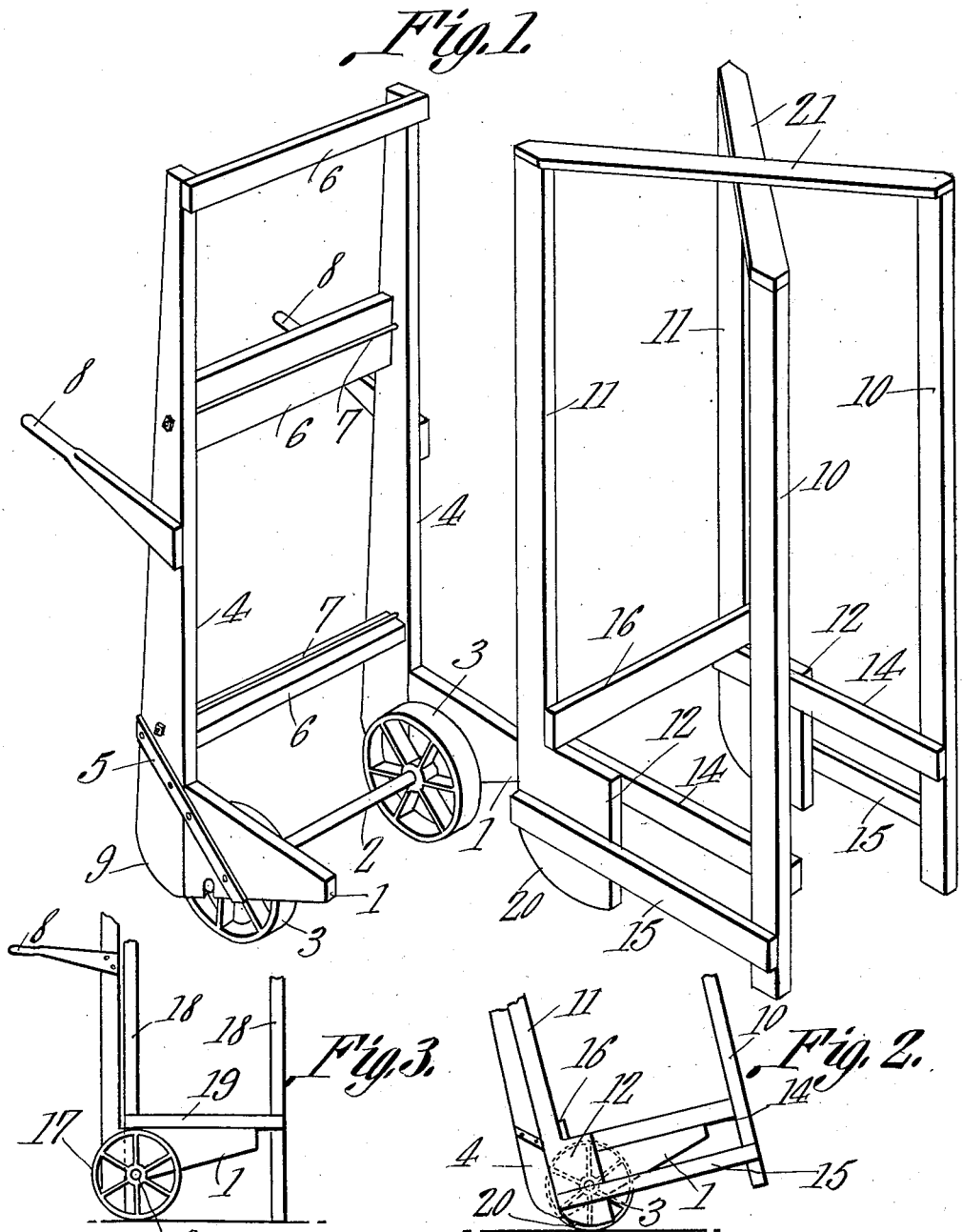

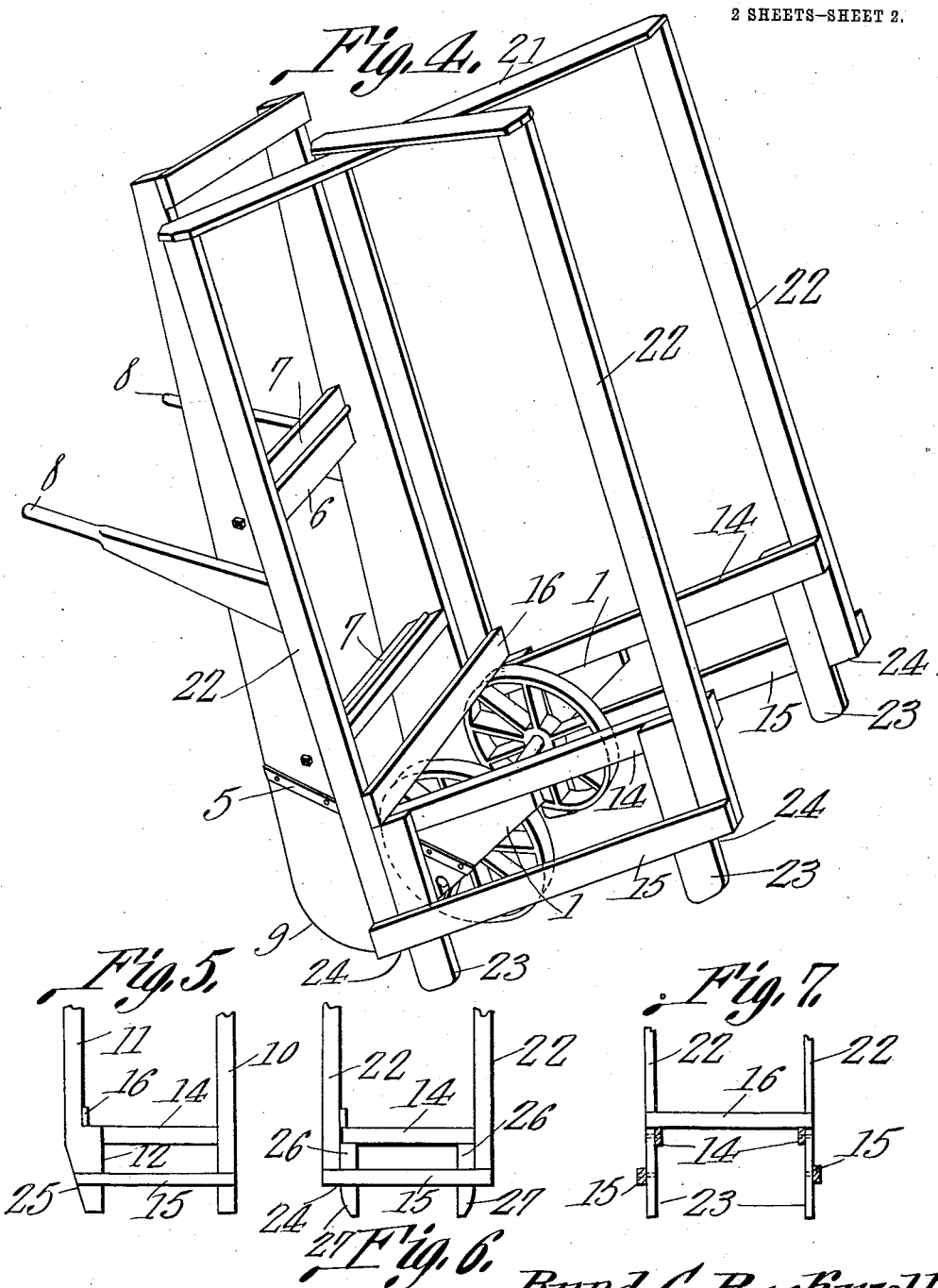

UNITED STATES PATENT OFFICE.

BYRD C. ROCKWELL, OF MALVERN, ARKANSAS.

TRUCK.

1,024,701.  Specification of Letters Patent.  Patented Apr. 30, 1912.

Application filed June 3, 1910. Serial No. 564,796.

*To all whom it may concern:*

Be it known that I, BYRD C. ROCKWELL, a citizen of the United States, residing at Malvern, in the county of Hot Springs and State of Arkansas, have invented a new and useful Truck, of which the following is a specification.

It is the object of this invention to provide a combined storage and transportation device, consisting of a rack adapted to rest upon a fixed support, and to be filled with merchandise, the device further including a wheel-mounted truck, so constructed that it may be inserted beneath the rack, and tilted, to lift the rack off the support, and to position the center of gravity of the rack above the wheels of the truck, the rack being so constructed that it may be titled with the truck, into a balanced position upon the truck axle, without engaging the support upon which the truck and the rack are upheld.

The drawings show typical embodiments merely, and it is to be understood that changes, properly falling within the scope of what is claimed, may be made without departing from the spirit of the invention.

In the accompanying drawings:—Figure 1 shows the transportation and storage structure in perspective, the component members thereof being spaced apart in order that the outline of the same may more clearly appear; Fig. 2 is a fragmental side elevation showing the rack delineated in Fig. 1 mounted in position upon the truck, the truck being tilted rearwardly and into its wheeling position; Fig. 3 is a side elevation showing a modified form of truck inserted beneath a modified form of rack, the parts being positioned as they will appear before the truck is tilted for the purpose of wheeling the rack away; Fig. 4 is a perspective showing a modified for of rack mounted upon the truck, the truck and the rack being tilted rearwardly to lift the rack free from the ground; Fig. 5 is a modified form of the invention, showing a slightly different sort of rack; Fig. 6 is a side elevation of another form of rack; and Fig. 7 is a vertical section of the racks shown in Figs. 4 and 6.

The combined transportation and storage structure forming the subject matter of this application, consists of a wheel-mounted truck, and a rack which is adapted to be engaged by and carried upon the said truck. The truck consists of parallel arms 1 in which are mounted the ends of an axle 2, carrying wheels, 3, located between the arms 1. Fixed to and rising from the arms 1, adjacent their rear ends, are upright, parallel standards 4, diagonally disposed strips 5 being employed for the purpose of connecting the standards 4 with the arms 1. The standards 4 are connected at spaced points, by a plurality of cross pieces 6, and tie bolts 7 may be employed for connecting the standards together. Outstanding from the intermediate portions of the standards 4 and disposed oppositely to the arms 1, are handles 8, whereby the truck may be tilted rearwardly and rolled about from place to place.

Upon a truck constructed as hereinbefore described, the rack, constituting a part of this invention, is adapted to be mounted. The rack comprises front posts 10, and rear posts 11, the rear posts 11 being provided, adjacent their lower ends, with forwardly disposed extensions. These extensions 12 are adapted to receive braces 14, the forward ends of which are connected with the front posts 10. Braces 14 are connected with the extensions 12, upon the adjacent faces of the said extensions. Disposed below the braces 14, and united with the remote faces of the extensions 12, and united likewise with the front posts 10, are other braces 15. The rear posts 10 are connected by a transversely disposed tie 16, the same resting upon the upper edges of the extensions 12, and being disposed in the angle defined by the said extensions and the rear posts proper 11.

In practical operation, a rack, constructed as delineated in Fig. 1 may be placed in a store room, upon a wharf, or elsewhere, and loaded with merchandise, the rack standing upright upon the posts 10 and 11. When it is desired to wheel away the rack and its contents, the truck shown in Fig. 1 is wheeled up to the rack, the arms 1 of the truck being thrust beneath the braces 14. When the arms 1 are thus positioned beneath the braces 14, the operator, by engaging the handles 8, may tilt the truck rearwardly, thus lifting all of the legs of the rack off the ground, and disposing the center of gravity of the rack and its contents above the axle 2 of the truck. It is to be noted that the lower edges of the extensions 12 of the rear post 11, are rounded as at 20, while the lower ends of the standards 11 of the truck are likewise rounded as denoted by the numeral 9. By reason of this cutting away of the elements at their lower ends, both the truck and the rack may be tilted rearwardly, to dispose the center of gravity of the load in proper relation with respect to the axle 2 of the truck, the truck and the rack thus being tilted without causing the rear posts 11 to engage the ground. When thus positioned, the truck, the rack, and the load therein may be wheeled away. Thus, a single truck may be employed to handle a plurality of racks delineated in Fig. 1.

The rack is a simple and inexpensive structure, and a large number of these racks may be provided for each truck, a relatively small number of trucks being necessary to handle a large number of racks. It is not necessary that the rack be immediately unloaded after it has been deposited in the stock room or elsewhere by the truck. The construction of the rack is inexpensive, and the same may be used, not merely as a means for holding the merchandise upon the truck, but, as well, as a device in which the merchandise may be stored after it has been wheeled to its destination upon the truck.

If desired, the truck may be modified to the extent delineated in Fig. 3. In such instance, the wheels 17 instead of being disposed between the arms 1, are located upon the outside of the said arms. By this construction, a wider wheel base is afforded, and the structure shown in Fig. 3 will perhaps be more satisfactory than that shown in Fig. 1, when heavy loads are to be wheeled; notably when such loads are to be wheeled upon an insecure or shaky foundation. When the truck shown in Fig. 3 is employed, the arms 1 are inserted, not beneath the braces 14, as above described, but, upon the other hand, beneath the braces 15. Thus, the rack delineated in Fig. 1 may be employed either in connection with the truck shown in the said figure, or with the truck or wider wheel base, shown in Fig. 3.

If desired, the rack may be simplified, as shown in Fig. 3. In such case, four upright posts 18 are provided, the same being connected upon opposite sides, and upon their remote faces, by transverse braces 19, beneath which the outstanding arms of the truck shown in Fig. 3, may be inserted. The rack shown in Fig. 3 is adapted peculiarly for use with the truck shown in the same figure, while the rack shown in Fig. 1 may be employed either with the truck shown in that figure, or with the truck shown in Fig. 3.

Whatever form is given to the rack, the upright posts may be connected by diagonally disposed braces 21, seen most clearly in Figs. 1 and 4 of the drawings; or any suitable frame structure adapted to connect the upper ends of the posts and to prevent them from spreading, may be employed.

Referring to Fig. 4, wherein a modified form of rack is shown, it will be seen that the same comprises four straight posts 22, short legs 23 being connected with the braces 14 and 15, and abutting against the adjacent edges of the posts 22, upon both sides of the rack. The legs 23 are thus offset from the posts 22, as shown at 24, the construction permitting the rearward tilting of the truck and the rack, as hereinbefore described. The legs 23 may be considered as extensions of the posts 22, upon which extensions the tie member 16 rests.

Instead of rounding the rear posts of the rack, as shown at 20 in Fig. 1, the same may be cut away diagonally, and in a straight line, as disclosed at 25 in Fig. 5. Likewise, the legs may be modified as denoted by the numeral 26 in Fig. 6, wherein both the forward and rear edges of the legs are rounded, as seen at 27.

It is to be noted that when the forms of racks shown in Figs. 3, 6, and 4 are employed, the arms 1 of the truck may be thrust beneath the transverse braces of the rack, from either the front or the rear of the rack. Thus the operator is permitted to approach the rack from either side thereof, lift the rack upon the truck, and wheel the same away.

Attention is directed to the fact that in constructing the rack, that portion of the rack which is adapted to be disposed adjacent the standards 4 and near the wheels 3, is cut away in some manner, so as to permit the tilting of the truck and the rack, without causing the lower rear end of the rack to engage the ground. In Fig. 1 of the drawings, this cutting away is effected at 20; in Fig. 4, the cutting away is effected at 24; in Fig. 5 the cutting away is effected at 25 and in Fig. 6 the offset 24 furnishes the necessary cutting away, to permit the truck and the rack to be tilted.

Any of the racks herein disclosed may be positioned upon a fixed support, such as a floor or the surface of the ground, and filled with merchandise. The arms 1 of the truck may then be thrust beneath the rack, and the same may be tilted, to bring its center of gravity over the wheels of the truck. Thus, a load may be wheeled, which, in the absence of the cutting away of the rack, whereby the same may be tilted without engaging the ground, could not be lifted or handled.

Having thus described the invention what is claimed is:—

A rack including posts, certain of which are cut away at their lower ends and at their outer edges to permit the rack to clear a support when the rack is tilted on a truck; and oppositely disposed braces connecting pairs of the posts upon both the inner and outer sides of the posts, whereby the arms of a truck may be engaged with the braces either between or upon the outside of the pairs of posts; the braces upon the inner sides of the posts being at a different elevation from the braces upon the outer sides of the posts; the posts which are cut away being provided with extensions to which the braces are secured; and a tie connecting the last named posts and the braces and resting upon the extensions.

In testimony that I claim the foregoing as my own, I have hereto affixed my signature in the presence of two witnesses.

BYRD C. ROCKWELL.

Witnesses:
J. ELMO YOUNG,
S. E. SMITH.

Copies of this patent may be obtained for five cents each, by addressing the "Commissioner of Patents, Washington, D. C."